United States Patent

[11] 3,628,991

[72] Inventors William C. Thiele
 Somerville;
 Charles H. Barger, Nixon; Joseph J.
 Thomas; Robert T. Hucks, Jr., both of
 Somerville, all of N.J.
[21] Appl. No. 792,821
[22] Filed Jan. 21, 1969
[45] Patented Dec. 21, 1971
[73] Assignee Johns-Manville Corporation
 New York, N.Y.

[54] METHOD OF BONDING EPOXY RESINS TO POLYVINYL CHLORIDE
 12 Claims, No Drawings
[52] U.S. Cl. .................................................. 117/72,
 117/77, 117/94, 117/138.8 UA, 117/161 A,
 117/161 ZB, 117/162, 138/141, 138/146,
 138/174, 161/170, 161/185, 161/253, 161/255,
 156/297, 118/DIG. 11
[51] Int. Cl. ..................................................... B44c 3/02,
 B44c 3/00
[50] Field of Search........................................... 117/72, 77,
 94, 162, 161 A, 161 ZB; 138/145, 146, 141, 140,
 137, 149, 174, 172; 156/392, 330, 331, 279, 297;
 161/170, 185, 253, 255

[56] References Cited
 UNITED STATES PATENTS
3,028,902 4/1962 Formanek ................... 117/162 X

| | | | |
|---|---|---|---|
| 3,002,534 | 10/1961 | Noland......................... | 138/145 X |
| 3,008,493 | 11/1961 | Roe............................. | 138/146 |
| 3,012,585 | 12/1961 | O'Brien........................ | 138/145 X |
| 3,149,996 | 9/1964 | Wagner et al................. | 117/72 X |
| 3,447,572 | 6/1969 | Vanderbilt et al............. | 138/146 X |
| 3,498,827 | 3/1970 | Vanderbilt et al............. | 117/94 X |

Primary Examiner—Ralph S. Kendall
Assistant Examiner—Edward G. Whitby
Attorneys—John A. McKinney and Robert M. Krone ABSTRACT: In a preferred embodiment, a polyvinyl chloride surface attached through an intermediate thermoplastic to a thermosetting resin, accomplished by a preferred process in which solvated acrylonitrile butadiene styrene copolymer in a methyl ethyl ketone solvent is sufficiently applied to a polyvinyl chloride surface to solvate the surface and to form a surface solution of the polyvinyl chloride and the acrylonitrile butadiene styrene copolymer, drying the surface solution, placing a substantially uncured liquid epoxy resin in contact with the dried surface solution and/or coating of the solvated acrylonitrile butadiene styrene, and curing sufficiently to form a bond between said copolymer and said epoxy resin. Preferably, the epoxy resin is carried on glass fibers, i.e., glass fibers impregnated with the resin, and preferably the polyvinyl chloride surface is cylindrical in shape, in the form of a pipe. Accordingly, a preferred product is a glass fiber-reinforced polyvinyl chloride pipe.

METHOD OF BONDING EPOXY RESINS TO POLYVINYL CHLORIDE

This invention relates to the bonding of an epoxy resin surface to a polyvinyl chloride surface. More particularly, the invention relates to a process of bonding epoxy resin-impregnated glass fibers to the surface of polyvinyl chloride pipe, whereby the pipes are reinforced and withstand high pressures without rupture of the interface bond between the epoxy resin and the polyvinyl chloride surface.

BACKGROUND

Although the problems to which this invention is directed are present to a significant degree also in pipes formed of multiple laminations of for example epoxy impregnated glass fibers and polyvinyl chloride surfaces and/or tapes, the importance of a durable and effective bond between an epoxy surface and a polyvinyl chloride surface is much greater where merely a relatively thin polyvinyl chloride pipe is reinforced with normally solely one or two layers of a wrapping comprising substantially glass fibers impregnated with epoxy resin. The resin saturated glass filaments are overwrapped around a polyvinyl chloride pipe. In the past, pipe reinforced in this manner by conventional filament winding techniques substantially failed to exhibit any satisfactory or significant bond between the epoxy-glass overwrap and the polyvinyl chloride core pipe. Such a lack of bond resulted in lowered strength properties and difficult problems with cutting, drilling tapping, and tapering without destruction of the pipe or fluid entrance under the overwrap. A conventional joint such as a "RING-TITE" (trademark) joint would expose cut edges of a cross section of the polyvinyl chloride pipe and the overwrap, whereby the interface would be exposed to the full line pressure carried within the pipe. Under such pressures, the interface promptly would separate, the polyvinyl chloride pipe substantially would collapse at least in part, and the reinforcing overwrap of epoxy resin-impregnated glass fibers thereby would fail to impart the desired reinforcing strength.

The problem arises from the chemical nature of various polymeric materials such as, for example, polyvinyl chloride resin, these resins being characteristically inert and chemically resistant. Chemical reactions of polyvinyl chloride are substantially confined to those of degradation in heat or strong radioactive environments. Normal prior art and/or conventional methods of attempting to achieve chemical bond or epoxide resin, directly or indirectly, to polyvinyl chloride are substantially ineffective, and unsuitable for avoiding the problems of the type discussed above.

Conventional and/or prior art adhesives and surface treatments have heretofore proven to be unsatisfactory.

Characteristic of prior patents directed to this long standing problem are: the U.S. Pat. No. 3,002,534, which employs a bonding adhesive composition; British Pat. No. 907,768 (complete specification filed on Jan. 8, 1960) which employs a swelling agent such a styrene monomer; U.S. Pat. No. 3,341,356 which employs a particular anchoring agent in the form of an organo silicone compound in which the organo group is attached directly to the silicone atom of the silane, contains a free amine or a compound capable of reacting with an amine, either in an aliphatic or in an aromatic group, and U.S. Pat. No. 2,815,043, which employs an intermediate plasticizer between the polyvinyl chloride surface and the epoxide resin surface, typical plasticizers for that invention being uncured thermosetting resin, dioctyl phthalate, diallyl phthalate, fatty acid esters, chlorinated paraffins, unsaturated fatty acids, tricresyl phosphate and the like. These patents are merely illustrative of various unsatisfactory attempts to solve varieties of the specific problems to which this invention is directed.

THE OBJECTS

An object of this invention is a process for effectively bonding two surfaces which are chemically dissimilar and which are substantially chemically incompatible.

Another object is in particular, a process for effectively bonding a polyvinyl chloride surface to an epoxy resin surface.

Another object is a process for producing a durable polyvinyl chloride pipe reinforced by epoxy resin-impregnated fibers such as glass fibers for example.

Another object is an article in which a surface of a polymeric composition is effectively bonded to a thermosetting resin.

Another object is an article including a polyvinyl chloride surface effectively bonded to a thermosetting resin such as an epoxy resin.

Another object is a polyvinyl chloride tube reinforced by epoxy resin-impregnated fibers such as glass fibers, effectively bonded to the polyvinyl chloride pipe or tube.

Other objects become apparent from the preceding and following disclosure.

SUMMARY OF THE INVENTION

The above objects are obtained by producing a novel article by a novel process comprising supplying to a surface of a first polymeric composition, a coating of a solvated, thermoplastic, different, second polymeric composition in a solvent for both said first composition and said second composition, sufficiently to produce a surface solution of said first composition and said second composition, applying a substantially uncured thermosetting resin to said surface solution, and curing said applied resin and said surface solution sufficiently to bond said resin to said second composition, said second composition being substantially chemically unreactive with said first composition, and being substantially incompatible with the first composition in other than a solvated state, said first composition being substantially chemically unbondable directly to either of said second composition and said resin, and said second composition being substantially curable to said resin.

In particular, the invention is directed to a process of applying to a surface of a polymeric olefinic chloride selected from the group consisting of polyvinylidine chloride polymer, polyvinylene chloride polymer, polyvinyl chloride polymer, and copolymers thereof, a coating of solvated butadiene-resin composition compatible with said polymeric chloride when solvated in a mutual solvent for both said butadiene-resin composition and said polymeric chloride, sufficiently to produce a surface solution of said polymeric chloride in said butadiene-resin composition, applying a substantially uncured thermosetting resin comprising substantially a member selected from the group consisting of epoxy resin and phenolic resin, to said surface solution, and curing said applied thermosetting resin and said surface solution sufficiently to bond said butadiene-resin composition to said thermosetting resin and to fuse said butadiene-resin and said polymeric halide in said surface solution.

Also the invention includes a surface composition of a first polymeric composition (such as polyvinyl chloride) in a fused solution with a thermoplastic (such as butadiene-styrene resin) different second polymeric composition which second composition is curably bonded to a thermosetting resin, said second composition being substantially chemically unreactive with said first composition and substantially incompatible with said first composition in other than a solvated state, said first composition being substantially chemically unbondable directly to either of said second composition and said resin, and said second composition being substantially curable to said resin. More particularly, the surface composition comprises preferably a polymeric olefinic chloride selected from the group consisting of polyvinylidine chloride polymer, polyvinylene chloride polymer, polyvinyl chloride polymer, and copolymers thereof, in a fused solution with butadiene-resin composition, and has a butadiene-resin coating of sufficient thickness on said fused surface that said coating is effectively bonded substantially to a cured thermosetting resin comprising a member selected from the group consisting of epoxy resin and phenolic resin.

BROAD DESCRIPTION

In a preferred embodiment of this invention, the process and the product formed thereby are directed to epoxy resin-impregnated (i.e. coated) glass fibers of the general type normally employed, for example, as reinforcing fibers, being effectively bonded to a polyvinyl chloride surface such as a polyvinyl chloride pipe of the type, for example, employed for the carrying of high-pressure fluids. The problems discussed above are only typical and illustrative of major problems encountered prior to this invention.

The broad concept of this invention is easily applicable to any opposing surfaces of the type described above which heretofore have presented apparently unsurmountable problems in efforts to effectively bond the two opposing chemically incompatible surfaces. Accordingly, the respective first polymeric composition, the thermoplastic different second polymeric composition, and the thermosetting resin, each includes all such compositions known to the prior art and/or used conventionally at the time of this invention, where for any particular combination of the three, the second composition is substantially incompatible with and substantially unreactive with the first composition in other than a solvatable state, the first composition is substantially chemically unbondable directly to either of the second composition or the thermosetting resin, and the second composition is substantially curable to the thermosetting resin.

In particular, for the specific and preferred composition of this invention toward which the invention is primarily directed, thereby overcoming specific and real problems faced in industry in for example the production of durable pipes of polyvinyl chloride reinforced with epoxy impregnated glass and being able to withstand cross-sectional jointing and high pressures within the pipes, it has been unexpectedly discovered that critically a butadiene polymer or copolymer thereof results in an effective bond between a polyvinyl chloride surface and an epoxy resin surface, which bond is highly superior to that of any other known prior to this invention, provided that the butadiene polymer or copolymer is fused to the polyvinyl chloride surface by producing a surface solution from said polyvinyl chloride and from said butadiene polymer or copolymer by any suitable method, and bonding butadiene molecules such as the surface molecules of the butadiene polymer or copolymer of the surface solution, of the thermosetting resin by placing the surface molecules of the butadiene polymer or copolymer in contact with either an uncured or at least sufficiently uncured (i.e. not fully cured) preferably liquid thermosetting resin and curing the thermosetting resin while in contact with the molecules of the butadiene polymer or copolymer. The thermosetting resin to which this invention is primarily directed, as discussed above, is an epoxy resin, the problem of obtaining a satisfactory bond between epoxy resin and polyvinyl chloride being well known in the trade. The butadiene polymer or copolymer is critically a thermoplastic polymer when bonding in particular a polyvinyl chloride polymer (resin) to in particular an epoxy resin. There is no known substitute for the butadiene polymer or copolymer.

In the practice of the process of this invention, it is within the scope of this invention either (1) first to form a fused surface solution of the butadiene polymer or copolymer with the surface of the polyvinyl chloride and thereafter contact surface particles (i.e. a coating) of the butadiene polymer or copolymer with the thermosetting resin which is sufficiently uncured that the butadiene polymer or copolymer bonds to the thermosetting resin when the contacted surfaces are cured, or (2) alternatively first bond the butadiene polymer or copolymer to the thermosetting resin, and thereafter fuse the butadiene polymer or copolymer to the polyvinyl chloride by forming a fused solution. The first above procedure is the preferred procedure of this invention, the results thereof having been highly satisfactory.

In the carrying out of the process of this invention, a typical process is as follows. A polyvinyl chloride surface is cleaned with a dry cloth or with alcohol, as needed, and acrylonitrile butadiene styrene resin is placed in solution, a typical solution having about 20 percent of the acrylonitrile butadiene styrene resin by weight, about 40 percent of methyl ethyl ketone solvent by weight, and about 40 percent of tetrahydrofuran by weight, for example. The resin solution is worked into the surface of the polyvinyl chloride, until the solvent and the acrylonitrile butadiene styrene molecules in solution have penetrated to a surface depth of normally about 0.5 to about 3 mils, for the surface coating up to about 7 mils. Although it is not essential to allow the surface to dry at this point, it is preferred to permit the surface to totally dry. Surface particles or molecules of the acrylonitrile butadiene styrene form an effective contact with a preferably substantially liquid epoxy system applied to the surface solution and/or acrylonitrile butadiene styrene coating thereon. The curable thermosetting resin, i.e. the curable epoxy in contact with the acrylonitrile butadiene styrene, is thereafter cured sufficiently to produce a bond.

Glass fibers for purposes of reinforcing the polyvinyl chloride surface may be applied by any one of several routes. For example, prior to the curing of the curable epoxy resin, glass fibers and/or filaments may be wrapped or otherwise applied to the curable epoxy in a manner for example in which the glass fibers become imbedded in the epoxy, and the epoxy resin thereafter cured. Alternatively, for example, glass fibers previously impregnated with epoxy resin and either in the uncured state or in the cured state thereafter may be applied to the curable epoxy resin already in contact with the acrylonitrile butadiene styrene articles or molecules on the surface of the fused solution of polyvinyl chloride and acrylonitrile butadiene styrene polymers. Although not preferred, the fused solution need not be completely dried—i.e. may be merely partially dried or if dried may be rewet by a solvent wipe, for example.

In a preferred embodiment, the epoxy applied to the acrylonitrile butadiene styrene is previously prepared by mixing epoxy resin with a conventional hardener, for example of the type known in the prior art.

An epoxide compound has an ether oxygen atom joined to two vicinal carbon atoms. The epoxy resins of this invention are reaction products of certain of these epoxide compounds with compounds having available hydrogen atoms linked to carbon atoms by oxygen atoms as for example polyhydric phenols and polyhydric alcohols. A typical epoxy resin of this invention is a reaction product for example of epichlorohydrin and a polyhydric phenol such as bisphenol-epichlorohydrin. Other illustrative epoxy resins typically include reaction products of epihalohydrins and polyhydric alcohols such as ethylene glycol, propylene glycol, trimethylene glycol, and the like.

Also included within the epoxy resins contemplated for this invention are epoxy silanes which may be coated on glass fibers, for example, such as are discussed in the U.S. Pat. No. 3,391,052.

The epoxide resins of this invention may be prepared by any suitable means, including well known prior art methods.

Although the polyvinyl chloride surface of the preferred embodiment of this invention is bondable to epoxy resin solely by the employment of a butadiene polymer or copolymer, as previously stated above, or other thermoplastic resin within the scope of this invention, it is possible to adhere a surface of a polyester resin, acrylic compounds, the phenol-formaldehyde compounds, the furfural-formaldehyde compounds, and the resorcinol-formaldehyde resins, for example. Any compounds of this type, such as prior art and/or conventional thermosetting resins known in the trade, are employable.

The particular solvent employable in this invention depends upon the two surfaces which are intended to be fused, such as for example the polyvinyl chloride surface and the acrylonitrile butadiene styrene. When a polyvinyl chloride surface for example is to be fused with a butadiene polymer or copolymer, a preferred solvent is tetrahydrofuran. HOwever, additional solvents for this specific preferred embodiment of the invention typically include methyl ethyl ketone, various ethers, cyclohexanone, methylene chloride, and the like. The selection of the appropriate solvent is easily ascertainable by making reference to conventional texts and the mere selection of the solvents in which both the polymeric surface and the intermediate polymer are soluble, such as for example the polyvinyl chloride surface and the acrylonitrile butadiene styrene each being soluble in tetrahydrofuran. As noted above, it is also within the scope of the invention to employ two or more various solvents in admixture, and/or emulsion.

Although this invention is primarily directed to the overcoming of long existing problems of great magnitude in the industry of applying to polyvinyl chloride pipe a bonded reinforcement of glass fibers, it is also within the scope of this invention to apply the invention to the reinforcement of various surfaces with fibers or threads or tapes of other types of material, other than glass, such as cotton, rayon, polyvinyl alcohol, or any other natural or artificial fiber material convincingly employable as a reinforcing material. Also, combinations may be employed of a plurality of fibers.

Although a preferred embodiment of this invention is directed specifically to polyvinyl chloride surfaces, the invention more broadly is directed to any polymeric olefinic chloride selected from the group consisting of polyvinylidine chloride polymer, polyvinylene chloride polymer, polyvinyl chloride polymer, and copolymers thereof.

In its more encompassing scope, the process of this invention and the products formed thereby include the bonding of various thermoplastics to other surfaces, for example surfaces of the type such as polyvinyl acetate, polymethyl methacrylate, polystyrene, polybutylene, vinyl butyral, and the like.

The term butadiene-resin composition includes for purposes of this invention various polymers or copolymers alone or in combination, such as butadiene resin, butadiene-styrene resin, acrylonitrile-butadiene-resin, acrylonitrile-butadiene-styrene resin, mixtures thereof, and the like.

In the practice of the process of this invention, the solvated thermoplastic polymer or resin includes solvent ranging from a minimal but effective amount up to about 95 percent by weight.

The above disclosure is intended only to serve merely as illustrative of the invention described herein, and is not intended to unduly limit the scope of this invention except to the extent expressly stated and to the extent that the appended claims are limited. Accordingly, the process and articles of this invention include all equivalents and/or substitutes of steps and/or elements which would be obvious to a person skilled in this art.

What we claim is:

1. A process comprising applying to a surface of a first polymeric resin composition, a coating of a solvated thermoplastic different second polymeric resin composition in a solvent for both said first composition and said second composition, sufficiently to produce a surface solution, applying a substantially uncured thermosetting resin to said surface solution, and curing said applied thermosetting resin and said surface solution sufficiently to bond said thermosetting resin to said second resin composition, said second resin composition being substantially chemically unreactive with said first resin composition and substantially incompatible with said first resin composition in other than a solvated state, said first resin composition being substantially chemically unbondable directly to either of said second resin composition and said thermosetting resin, and said second resin composition being substantially curable to said thermosetting resin.

2. A process comprising applying to a surface of a first polymeric resin composition comprising substantially a polymeric, resinous halide derived from an olefin, a coating of a solvated thermoplastic different second polymeric resin composition in an organic solvent for both said first composition and said second composition, sufficiently to produce a surface solution, applying a substantially uncured thermoplastic resin to said surface solution, and curing said applied thermoplastic resin and said surface solution sufficiently to bond said thermosetting resin to said second resin composition, said second resin composition being substantially chemically unreactive with said first resin composition and substantially incompatible with said first resin composition in other than a solvated state, said first resin composition being substantially unbondable directly to either said resin composition and said thermosetting resin, and said second resin composition being substantially curable to said thermosetting resin.

3. A process comprising (a) applying to a surface of a polymeric olefinic chloride selected from the group consisting of polyvinylidine chloride polymer, polyvinylene chloride polymer, polyvinyl chloride and copolymers thereof, a coating of solvated butadiene-resin composition selected from the group consisting of butadiene resin, butadiene-styrene resin, acrylonitrile-butadiene-resin, acrylonitrile-butadiene-styrene resin, compatible with said polymeric chloride when solvated in a mutual solvent for both said butadiene-resin composition and said polymeric chloride sufficiently to produce a surface solution including said polymeric chloride with said butadiene-resin composition, applying a substantially uncured thermosetting resin comprising substantially a member selected from the group consisting of an epoxy resin and a phenolic resin, to said surface solution, and (b) curing said applied thermosetting resin and said surface solution sufficiently to bond said butadiene-resin composition to said thermosetting resin and said butadiene-resin to said polymeric olefinic chloride surface.

4. A process comprising applying to a surface of a first polymeric composition comprising substantially polyvinyl chloride, a coating of a solvated thermoplastic different second polymeric composition of butadiene resin composition compatible with said polyvinyl chloride when solvated in a mutual organic solvent for both said butadiene resin and said polyvinyl chloride sufficiently to produce a surface solution of said polyvinyl chloride and said butadiene resin and in which said solvated butadiene-resin comprises substantially acrylontrile-butadiene-styrene copolymer, partially drying said surface solution, and applying a substantially uncured thermosetting resin which comprises substantially an epoxy resin and curing said applied thermosetting resin and said surface solution sufficiently to bond said second polymer composition of butadiene resin to said thermosetting epoxy resin and said second polymeric composition of butadiene resin to said first polymeric composition comprising polyvinyl chloride.

5. A process according to claim 4, in which said solvent ranges up to about 95 percent of said butadiene-resin composition, and in which said surface is an outer cylindrical surface of a pipe in which said uncured thermosetting resin comprises substantially an epoxy resin in the form of glass filaments having a coating of said substantially liquid and substantially uncured epoxy resin, whereby said process results in a tube of said polymeric chloride bonded to an outer reinforcing coating of glass fibers.

6. A process according to claim 3, in which said resin composition is at least about as solvatable as said surface, and is curably fusible to said substantially uncured epoxy resin, and in which said applying includes forming a surface coating of said butadiene-resin composition and at least partially drying said surface coating.

7. A process according to claim 6, in which said surface coating of a solvated thermoplastic different second polymeric composition penetrates the surface of the first polymeric composition of polyvinyl chloride to a depth ranging from about 0.5 mil to about 3 mils and in which said surface coating includes an additional thickness of said solvated butadiene-resin sufficient for a coated butadiene-resin-epoxy resin bond to be formed thereon.

8. A process according to claim 7, in which said polymeric olefinic chloride comprises substantially polyvinyl chloride, in which said butadiene-resin composition comprises substantially acrylonitrilembutadiene-styrene copolymer, and in which said surface coating ranges from about 1 mil to about 7 mils.

9. A process according to claim 8, in which said surface is an outer cylindrical surface of a pipe in which said uncured thermosetting resin comprises substantially an epoxy resin which is in the form of glass filaments saturated with said uncured epoxy resin whereby said process results in a polyvinyl chloride tube bonded to an outer coating of glass fibers, in which said solvent ranges up to about 95 percent of said solvated butadiene-resin, and in which said solvent is selected from the group consisting of methyl ethyl ketone, ethylic ether, tetrahydrofuran, cyclohexanone, and methylene chloride.

10. A surface composition of a polymeric chloride, selected from the group consisting of polyvinylidene chloride, polyvinylene chloride, polyvinyl chloride and copolymers thereof, having thereon a fused solution of a butadiene-resin composition and said polymeric chloride, and having a butadiene-resin-composition coating on said fused surface, said butadiene-resin-composition coating being bonded to a substantially cured thermosetting resin comprising a member selected from the group consisting of epoxy resin and phenolic resin.

11. A surface composition of a polymeric chloride, selected from the group consisting of polyvinylidene chloride, polyvinylene chloride, polyvinyl chloride and copolymers thereof comprising said surface shaped substantially as a cylindrical surface, said surface having thereon a fused solution of a butadiene-resin-composition and said polymeric chloride, which penetrates the said polymeric chloride surface a depth ranging from about 0.5 mil to about 3 mils, and having a butadiene-resin-composition coating on said fused surface, said butadiene-resin-composition coating being bonded to a substantially cured thermosetting resin comprising substantially epoxy resin, and said fused solution and coating of resin-composition ranging from an effective amount up to about 7 mils in thickness, and in which said cured thermosetting resin comprises substantially epoxy resin which is in the form of glass filaments saturated with said uncured epoxy resin, whereby said fused cylindrical surface comprises a polymeric, olefinic chloride tube bonded to glass fibers.

12. A fused and bonded surface of polymeric olefinic chloride composition comprising substantially polyvinyl chloride and comprising thereon a coating of a fused solution of a butadiene-resin composition and said polymeric olefinic chloride composition in which said butadiene-resin composition comprises substantially acrylonitrile butadiene styrene, said fused solution penetrating the said polymeric olefinic chloride surface to a depth ranging from about 0.5 mil to about 3 mils and being of a thickness of up to about 7 mils, said coated polymeric olefinic chloride composition being bonded to a substantially cured thermosetting resin comprising substantially epoxy resin containing glass filaments saturated therewith whereby said fused and bonded surface comprises a polymeric olefinic chloride is bonded to said glass fibers.

* * * * *